United States Patent
Oda et al.

(10) Patent No.: US 12,115,650 B2
(45) Date of Patent: Oct. 15, 2024

(54) ROBOT CONTROL SYSTEM, ROBOT CONTROL METHOD, AND CONTROL PROGRAM

(71) Applicant: TOYOTA JIDOSHA KABUSHIKI KAISHA, Toyota (JP)

(72) Inventors: Shiro Oda, Anjo (JP); Tetsuya Taira, Nagakute (JP); Satoshi Toyoshima, Okazaki (JP); Yuta Watanabe, Toyota (JP); Takeshi Matsui, Nisshin (JP); Takayoshi Nasu, Okazaki (JP); Kei Yoshikawa, Nagoya (JP); Yusuke Ota, Nagakute (JP); Yutaro Ishida, Toyota (JP); Yuji Onuma, Nagoya (JP); Kyosuke Arai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 397 days.

(21) Appl. No.: 17/558,834

(22) Filed: Dec. 22, 2021

(65) Prior Publication Data
US 2022/0203553 A1  Jun. 30, 2022

(30) Foreign Application Priority Data
Dec. 24, 2020  (JP) ................. 2020-215176

(51) Int. Cl.
*B25J 11/00* (2006.01)
*B25J 9/00* (2006.01)
(Continued)

(52) U.S. Cl.
CPC ......... *B25J 11/0085* (2013.01); *B25J 9/0003* (2013.01); *G01G 19/52* (2013.01);
(Continued)

(58) Field of Classification Search
CPC ..... B25J 9/0003; B25J 11/0085; G01G 19/42; G01G 19/52; G05D 1/0212; G05D 1/0246; G05D 1/0282; G05D 1/0287; G05D 1/0274; G05D 1/024; G05D 1/0088; G05D 1/0214; G05D 1/0225; G05D 1/0255; G05D 1/10261; G05D 1/0272; G05D 1/0234;
(Continued)

(56) References Cited

U.S. PATENT DOCUMENTS

2007/0124024 A1   5/2007 Okamoto et al.
2019/0270204 A1*  9/2019 Kawamura ............ B25J 9/1697
(Continued)

FOREIGN PATENT DOCUMENTS

JP        6483505 B2     3/2019
JP        2019-153070 A  9/2019
WO        2006/013829 A1 2/2006

*Primary Examiner* — Jason Holloway
*Assistant Examiner* — Blake A Wood
(74) *Attorney, Agent, or Firm* — Dinsmore & Shohl LLP

(57) ABSTRACT

A robot control system according to a present embodiment is a robot control system for controlling a mobile robot that is configured to autonomously within a facility. When it is detected that one or more used trays, among a plurality of trays used for meal service within the facility, are returned to a first prescribed place, the system instructs the mobile robot to collect the trays returned to the first prescribed place and deliver the trays to a second prescribed place.

15 Claims, 9 Drawing Sheets

(51) Int. Cl.
  *G01G 19/52* (2006.01)
  *G05D 1/00* (2024.01)
  *G06K 7/14* (2006.01)
  *G06V 20/52* (2022.01)

(52) U.S. Cl.
  CPC ......... *G05D 1/0212* (2013.01); *G06K 7/1417* (2013.01); *G06V 20/52* (2022.01)

(58) Field of Classification Search
  CPC .. G05D 1/0278; G05D 1/0016; G05D 1/0033; G05D 1/0221; G05D 1/0223; G05D 1/0231; G05D 1/0238; G05D 1/0248; G05D 1/0257; G05D 1/0268; G05D 1/0276; G05D 1/0291; G06K 7/1417; G06V 10/95; G06V 20/10; G06V 20/52
  See application file for complete search history.

(56) References Cited

U.S. PATENT DOCUMENTS

| | | | |
|---|---|---|---|
| 2020/0103271 A1* | 4/2020 | Abou Mahmoud | ............................ G01G 23/3735 |
| 2021/0139065 A1* | 5/2021 | Ha | ........................ A47B 31/00 |
| 2021/0291372 A1* | 9/2021 | Lin | ...................... G05D 1/0274 |
| 2021/0342573 A1* | 11/2021 | Hwang | .................. G06V 10/74 |

* cited by examiner

ROBOT CONTROL SYSTEM, ROBOT CONTROL METHOD, AND CONTROL PROGRAM

CROSS-REFERENCE TO RELATED APPLICATION

This application claims priority to Japanese Patent Application No. 2020-215176 filed on Dec. 24, 2020, incorporated herein by reference in its entirety.

BACKGROUND

1. Technical Field

The present disclosure relates to a robot control system, a robot control method, and a control program.

2. Description of Related Art

Japanese Patent No. 6483505 discloses a delivery system that uses an autonomous mobile delivery robot to deliver trays used for meal service within facilities.

SUMMARY

In hospitals or the like, it is common that used trays used for meal service (including trays carrying used tableware) are returned to the vicinity of an entrance of each patient room (first prescribed place), and then collected from the vicinity of the entrance of each patient room to another place (second prescribed place) at a predetermined time. However, when used trays are left uncollected in the vicinity of the entrance of the patient room for a long time due to, for example, the used trays being returned earlier than expected, it causes sanitary problems, such as an odor of leftovers.

The present disclosure has been made in consideration of the above background, and it is an object of the present disclosure to provide a robot control system, a robot control method, and a control program, capable of enhancing sanitation by immediately collecting used trays.

A robot control system according to a present embodiment is a robot control system for controlling a mobile robot that moves autonomously within a facility. When it is detected that one or more used trays, among a plurality of trays used for meal service within the facility, are returned to a first prescribed place, the system instructs the mobile robot to collect the trays returned to the first prescribed place and deliver the trays to a second prescribed place. The robot control system immediately collects the used trays returned to the first prescribed place, even before appointed time. This makes it possible to prevent the used trays from being left uncollected for a long time, so that enhanced sanitation is achieved.

When it is detected that two or more prescribed number of used trays, among the plurality of trays used for meal service, are returned to the first prescribed place, the system may instruct the mobile robot to collect the prescribed number of trays returned to the first prescribed place and deliver the trays to a second prescribed place.

When a first prescribed time elapses after any one tray, among the plurality of trays used for meal service, is returned to the first prescribed place, the system may instruct the mobile robot to collect the tray returned to the first prescribed place and deliver the tray to the second prescribed place.

When another tray, among the plurality of trays used for meal service, is not returned to the first prescribed place after lapse of a second prescribed time after the any one tray is returned to the first prescribed place, the system may instruct the mobile robot to collect the tray returned to the first prescribed place and deliver the tray to the second prescribed place.

The system may detect the number of trays returned to the first prescribed place based on an image photographed by a camera that is configured to photograph the first prescribed place.

The plurality of trays used for meal service may each be attached with an IC tag. The first prescribed place may be provided with a return table having a tag reader. The system may detect the number of trays returned to the first prescribed place based on the result of reading the IC tag by the tag reader.

The first prescribed place may be provided with a return table equipped with a load sensor. The system may detect the number of trays returned to the first prescribed place based on a load detected by the load sensor.

The robot control system includes: the mobile robot and a controller. The mobile robot is configured to autonomously move within a facility. The controller is configured to control the mobile robot.

A robot control method according to the present embodiment includes: a step of monitoring a return status of a plurality of trays to a first prescribed place, the trays being used for meal service within the facility; and a step of, when it is detected that one or more used trays, among the plurality of trays used for meal service, are returned to the first prescribed place, instructing a mobile robot to collect the trays returned to the first prescribed place and deliver the trays to a second prescribed place. The robot control method immediately collects the used trays returned to the first prescribed place, even before appointed time. This makes it possible to prevent the used trays from being left uncollected for a long time, so that enhanced sanitation is achieved.

A control program according to the present embodiment causes a computer to execute processing including: processing to monitor a return status of a plurality of trays to a first prescribed place, the trays being used for meal service within the facility; and processing to instruct, when it is detected that one or more used trays, among the plurality of trays used for meal service, are returned to the first prescribed place, a mobile robot to collect the trays returned to the first prescribed place and deliver the trays to a second prescribed place. The control program immediately collects the used trays returned to the first prescribed place, even before appointed time. This makes it possible to prevent the used trays from being left uncollected for a long time, so that enhanced sanitation is achieved.

According to the present disclosure, it is possible to provide a robot control system, a robot control method, and a control program, capable of enhancing sanitation by immediately collecting used trays.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

While the present disclosure will be described hereinafter through embodiments of the present disclosure, the present disclosure in the scope as set forth by the claims is not limited by the embodiments disclosed below. Moreover, not all the component members to be described in the embodiments are necessary for accomplishing the object. For clear understanding, the following descriptions and drawings are omitted and simplified as appropriate. In each of the drawings, like component members are denoted by like reference signs, and redundant description is omitted as necessary.

First Embodiment

Hereinafter, a robot control system according to a first embodiment will be described. A robot control system is a system for controlling a mobile robot that is configured to be movable autonomously within a prescribed facility. The robot control system may be a single mobile robot, or may be a system including one or more mobile robots and a server device (controller) that manages (controls) the mobile robots. The mobile robots include delivery robots that move autonomously to deliver items. In the present embodiment, the case where the robot control system is a single mobile robot will be described. In the present embodiment, the mobile robot is used as a delivery robot that moves autonomously to delivery meal service trays.

Configuration of Mobile Robot

Figure 1:
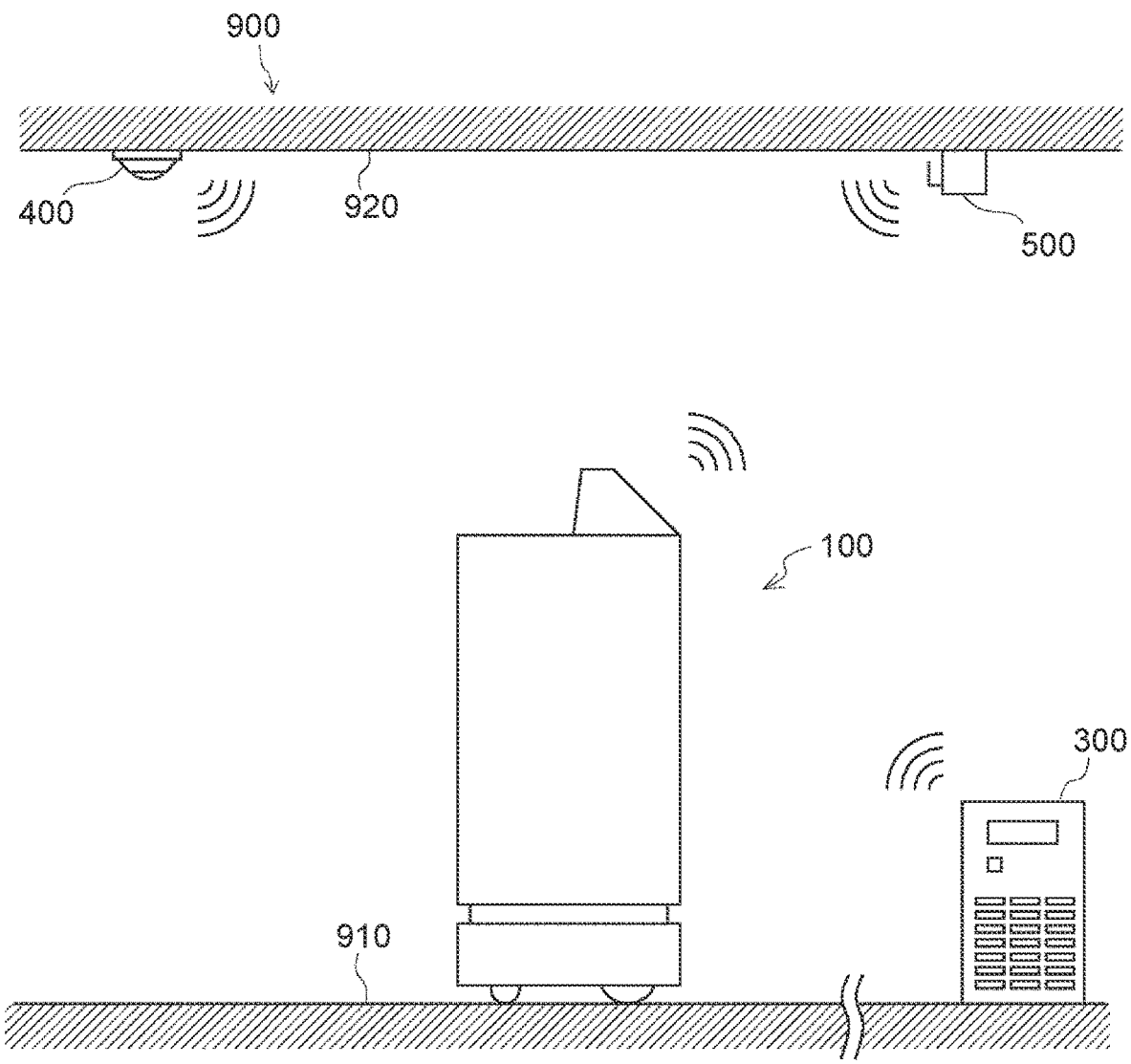
FIG. 1 is a schematic view illustrating a mobile robot that is robot control system according to a first embodiment.

FIG. 1 is a perspective view illustrating the mobile robot according to the first embodiment. As shown in FIG. 1, a mobile robot 100 is configured to be movable autonomously within a prescribed facility 900. The prescribed facility 900 is a hospital, for example. Note that the prescribed facility 900 is not limited to the hospital. The prescribed facility 900 may be any facilities, such as hotels and shopping malls, as long as the mobile robot 100 can move autonomously therein. The present embodiment will be described by taking the case where the prescribed facility 900 is a hospital as an example.

The mobile robot 100 moves autonomously on a floor surface 910 in the facility 900. A facility camera 400 is fixed to the inside of the facility 900. For example, the facility camera 400 is fixed to a ceiling 920 of the facility 900, and images the vicinity of the facility camera 400 to generate image data. A plurality of facility cameras 400 may be installed within the facility 900.

The mobile robot 100 and the facility camera 400 are communicably connected to each other by techniques of information transmission such as wireless communication. For example, the mobile robot 100 and the facility camera 400 can be connected so as to be directly communicable or connected so as to be communicable via an access point 500 and a server device 300. The mobile robot 100 acquires image data from the facility camera 400 directly or via the access point 500 and the server device 300.

The access point 500 is, for example, an access point for a wireless LAN. The access point 500 is fixed to the inside of the facility 900 to acquire, from the mobile robot 100 positioned around the access point 500, position information, travel information, or other information, regarding the mobile robot 100. A plurality of access points 500 may be provided within the facility 900.

A plurality of mobile robots 100 may move autonomously within the facility 900. When the mobile robots 100 move autonomously, the mobile robots 100 may be communicably connected to each other by techniques of information transmission such as wireless communication. For example, the mobile robots 100 may be connected so as to be directly communicable with each other or connected so as to be communicable with each other via the access points 500 and the server device 300.

Figure 2:
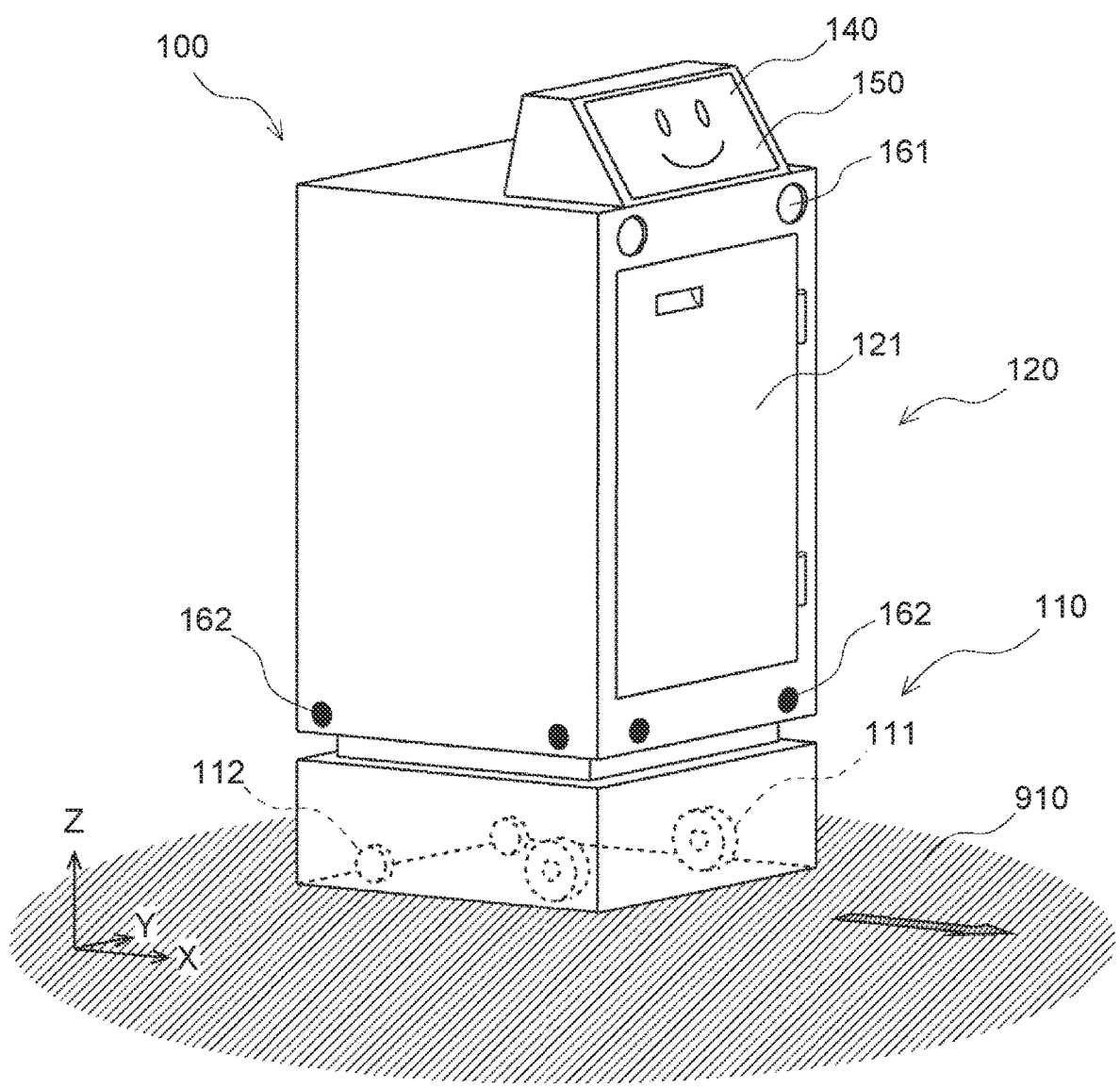
FIG. 2 is a perspective view illustrating the mobile robot according to the first embodiment.
Figure 3:
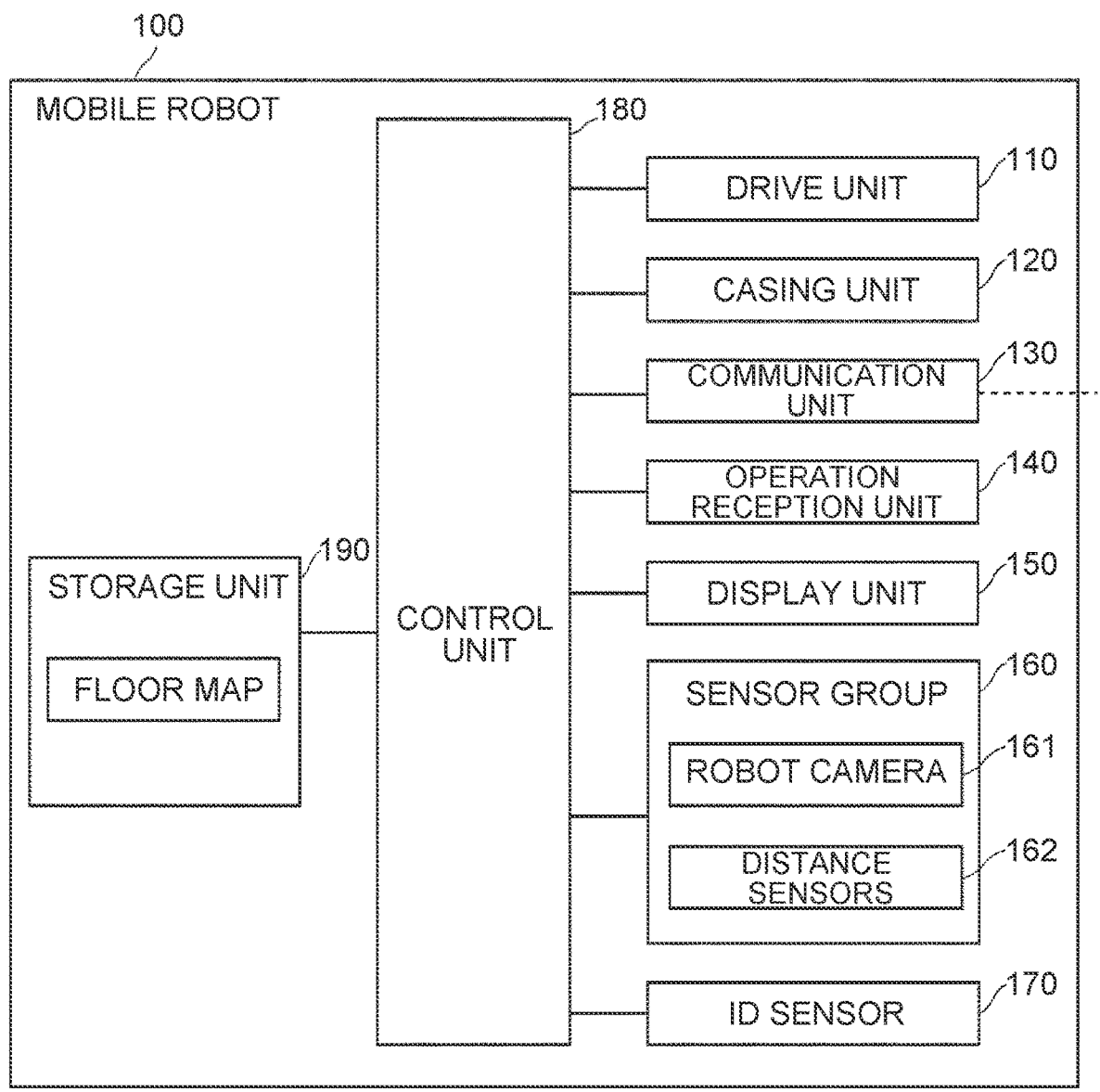
FIG. 3 is a block diagram illustrating the mobile robot according to the first embodiment.

FIG. 2 is a perspective view illustrating the mobile robot 100 according to the first embodiment. FIG. 3 is a block diagram illustrating the mobile robot 100 according to the first embodiment. As shown in FIGS. 2 and 3, the mobile robot 100 includes a drive unit 110, a casing unit 120, a communication unit 130, an operation reception unit 140, a display unit 150, a sensor group 160, an ID sensor 170, a control unit 180, and a storage unit 190.

As shown in FIG. 2, the mobile robot 100 is a mobile object that moves on the floor surface 910 that is a moving surface. Here, an XYZ orthogonal coordinate system is used to facilitate description of the mobile robot 100. The floor surface 910 is defined as an XY plane, and an upward direction is defined as a +Z-axis direction.

The drive unit 110 functions as moving unit for the mobile robot 100. The drive unit 110 includes two drive wheels 111 and two casters 112. The drive wheels 111 are in contact with the floor surface 910 and are set to be independently rotatable about one axis of rotation that extends in perpendicular direction (right-left direction or Y-axis direction in the drawing) to a straight advancing direction (front-rear direction or X-axis direction in the drawing). The casters 112 are in contact with the floor surface. The mobile robot 100 moves forward or backward by driving the drive wheels 111 disposed on right and left sides at the same speed. The mobile robot 100 makes a turn by setting the right and left drive wheels 111 to be different in rotation speed or rotation direction. The drive unit 110 drives the drive wheels 111 in response to an instruction from the control unit 180.

The casing unit 120 is disposed above the drive unit 110 in the mobile robot 100. The casing unit 120 may have a housing chamber door 121. When the housing chamber door 121 is opened, a housing chamber is in the casing unit 120 for housing a prescribed article to be delivered. In the present embodiment, for example, meal service trays carrying hospital meals that are served for patients, or used meal service trays are housed in the housing chamber. The casing unit 120 may open and close the housing chamber door 121 in response to an instruction from the control unit 180.

As shown in FIG. 3, the communication unit 130 is an interface that is communicably connected to the outside. The communication unit 130 includes, for example, an antenna and a circuit that modulates or demodulates signals transmitted through the antenna. The communication unit 130 receives image data from the facility camera 400 directly or via the access point 500 and the server device 300.

The communication unit 130 may also receive information about destinations and information about the propriety of movement from the server device 300. The communication unit 130 may also transmit to the server device 300 information about the state of the mobile robot 100, position information, travel information, or other information. The communication unit 130 may also exchange the position information and image data with other mobile robots 100 directly or via the access points 500 and the server device 300.

The communication unit 130 may periodically transmit a heartbeat signal to the server device 300. The heartbeat signal may include log data chronologically indicating the state of the mobile robot 100. The heartbeat signal may also include an identification (ID) of the mobile robot 100 and an ID of a user who operates the mobile robot 100.

The communication unit 130 connects to the control unit 180 to output a signal including information transmitted from the facility camera 400 and the server device 300 to the control unit 180. The communication unit 130 also transmits a signal output from the control unit 180 to the server device 300.

Upon reception of an input operation from a user, the operation reception unit 140 transmits an operation signal to the control unit 180. The operation reception unit 140 may have, for example, operation buttons or a touch panel overlaid on the display unit 150 for receiving the input operation from the user. The user operates the operation reception unit 140 to turn on or off electric power supply, to open and close the housing chamber door 121, and the like.

For example, the display unit 150 is provided so as to protrude from an upper surface of the casing unit 120. The display unit 150 is, for example, a display unit including a rectangular liquid crystal panel. The display unit 150 appropriately displays information in response to an instruction from the control unit 180. On the display unit 150, a touch panel for receiving the operation from the user may be overlaid.

The sensor group 160 includes sensors that acquire the data necessary for the mobile robot 100 to move autonomously. The sensor group 160 includes, for example, a robot camera 161 and distance sensors 162. The sensor group 160 may also include sensors other than the robot camera 161 and the distance sensors 162.

The robot camera 161 is, for example, disposed on the upper part of the casing unit 120 that is below the display unit 150. The robot camera 161 may be constituted of two camera units with the same viewing angle, the camera units being disposed horizontally apart from each other. Images taken by the respective camera units are output to the control unit 180 as image data.

For example, the distance sensors 162 are disposed on the lower parts of the casing unit 120. The distance sensors 162 may be disposed on the lower parts of a +X-axis side surface, a −X-axis side surface, a +Y-axis side surface, and a −Y-axis side surface in the casing unit 120. The distance sensors 162 measure the distance to objects around the mobile robot 100. By analyzing the image data output by the robot camera 161 and the detection signals output by the distance sensors 162, the control unit 180 recognizes obstacles around the mobile robot 100 and measures the distance between the mobile robot 100 and the obstacles.

For example, the ID sensor 170 is provided in the vicinity of the display unit 150. The ID sensor 170, which identifies the ID of the user who operates the mobile robot 100, detects a unique identifier included in an ID card owned by each user. For example, the ID sensor 170 includes an antenna for reading information in each wireless tag. To make the mobile robot 100 recognize the ID of the user who operates the mobile robot 100, the user brings the ID card close to the ID sensor 170.

The control unit 180 is an information processing device having an arithmetic device such as a central processing unit (CPU). The control unit 180 includes hardware of the control unit 180, and programs stored in the hardware. Specifically, the processing executed by the control unit 180 is implemented by one of hardware and software.

The control unit 180 acquires various information from various component members, and gives an instruction to each component member in accordance with the information acquired. For example, the control unit 180 detects the distance between the mobile robot 100 and peripheral objects, based on image data acquired from the facility camera 400 and the robot camera 161, and information about objects around the mobile robot 100 acquired from the distance sensors 162. The control unit 180 then calculates a route to a destination based on the detected distance, position information, or the like. The control unit 180 then gives an instruction to the drive unit 110 to move along the calculated route. When such processing is executed, the control unit 180 refers to information about a floor map stored in the storage unit 190.

The storage unit 190 includes a non-volatile memory such as flash memories and solid state drives (SSDs). The storage unit 190 stores the floor map of the facility used for autonomous movement of the mobile robot 100. The storage unit 190 is connected to the control unit 180, and outputs the stored information to the control unit 180 in response to a request from the control unit 180.

As shown in FIG. 2, a +x-axis direction of the mobile robot 100 on which the robot camera 161 is disposed is defined as a front side. In other words, during normal movement, the +x-axis direction is an advancing direction as indicated with an arrow.

Note that various ideas can be adopted for how to define the front side of the mobile robot 100. For example, the front side of the mobile robot 100 can be defined based on how the sensor group 160 for recognizing the surrounding environment is disposed. Specifically, among the side surfaces of the casing unit 120 of the mobile robot 100, the side on which a sensor with high recognition capability is disposed or many sensors are disposed may be defined as the front side of the mobile robot 100. By defining the front side of the mobile robot 100 in this way, the mobile robot 100 can move while more accurately recognizing the surrounding environment. The mobile robot 100 in the present embodiment also defines the +x-axis direction where the robot camera 161 is disposed as the front side.

Alternatively, it is possible to define the front side based on how the display unit 150 is disposed. When the display unit 150 displays a character's face or the like, people around the mobile robot 100 naturally recognize that the side of the display unit 150 is the front side of the mobile robot 100. Therefore, the side of a display surface of the display unit 150 being defined as the front side of the mobile robot 100 gives less sense of discomfort to the people around the mobile robot 100. The mobile robot 100 in the present embodiment also defines the side of the display surface of the display unit 150 as the front side.

It is also possible to define the front side of the mobile robot 100 based on the shape of the casing of the casing unit 120. For example, when a projected shape of the casing unit 120 onto the travel surface is rectangular, passing people are less disturbed during movement when a shorter side of the casing unit 120 is defined as the front side than when a longer side is defined as the front side. In other words, depending on the shape of the casing, some casing surfaces are more agreeable as the front side during normal movement. The mobile robot 100 in the present embodiment also defines the shorter side of the rectangle as the front side. The front side of the mobile robot 100 is defined so as to conform to some ideas as describe above. Based on which idea the front side is to be defined may be determined in consideration of the shape, role, or the like of the mobile robot.

Operation of Mobile Robot

Description is now given of the operation of the mobile robot in the present embodiment. For example, a user turns on the electric power supply of the mobile robot 100. The user then inputs a desired task to the operation reception unit 140. At the time of turning on the electric power supply or operating the operation reception unit 140, the ID sensor 170 is used to identify the user ID where necessary.

When the desired task is to deliver an item, the user operates the operation reception unit 140 to open the housing chamber door 121 and puts the item in the housing chamber. The user then operates the operation reception unit 140 to close the housing chamber door 121.

Then, the user inputs a delivery destination of the item with the operation reception unit 140. As a consequence, the control unit 180 of the mobile robot 100 searches for a route from the delivery source to the delivery destination using the floor map stored in the storage unit 190. The mobile robot 100 then delivers the item along the route derived from the floor map, while avoiding obstacles such as installation objects and people.

Figure 4:
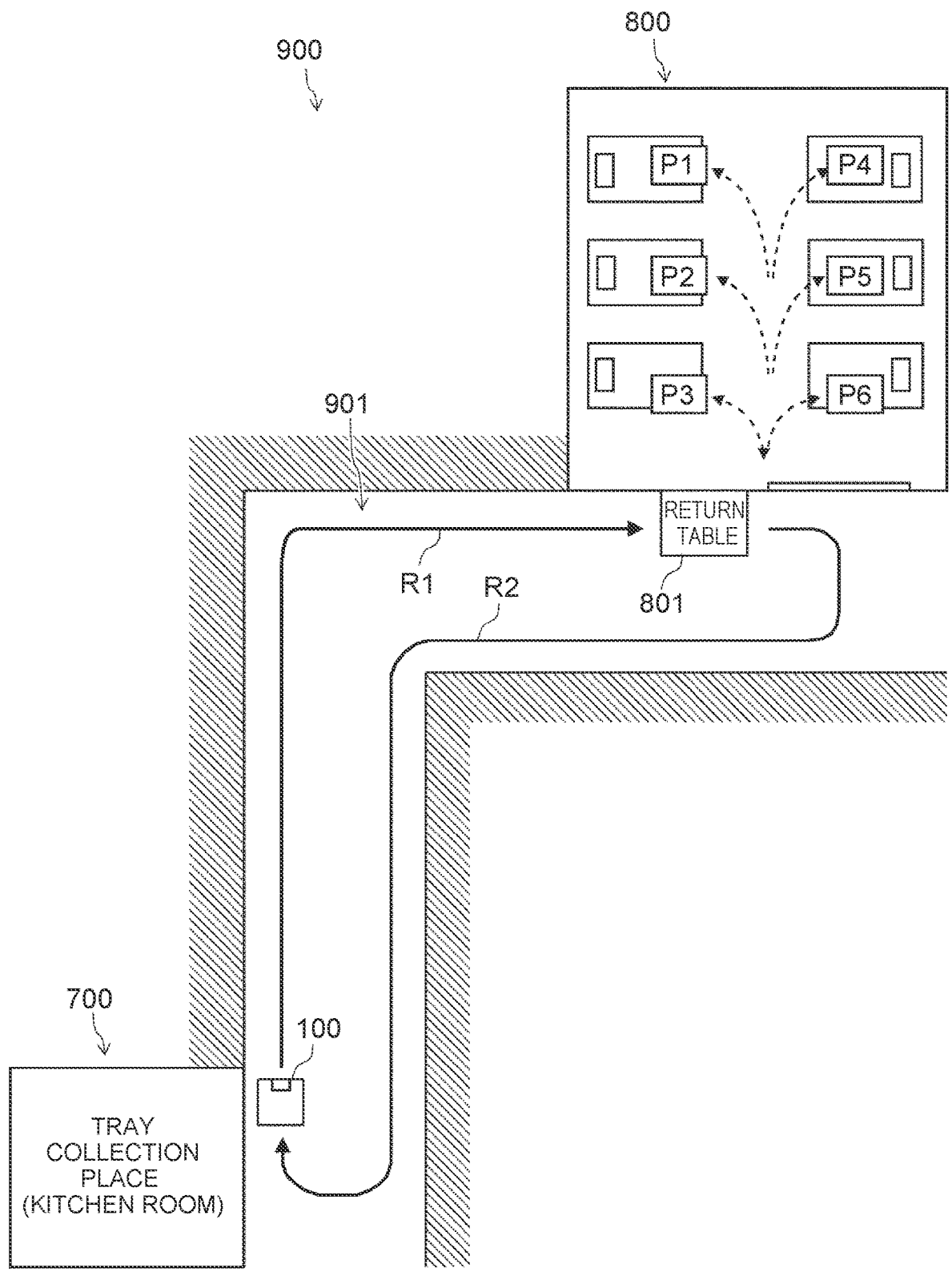
FIG. 4 is a schematic plan view illustrating movement of the mobile robot according to the first embodiment within a facility.

FIG. 4 is a schematic plan view illustrating movement of the mobile robot 100 within the facility. In the example of FIG. 4, the hospital facility 900 includes a kitchen room 700 for preparing hospital meals, a patient room 800, and a corridor 901 between the kitchen room 700 and the patient room 800. The kitchen room 700 also serves as a tray collection place. Hence, the kitchen room 700 is also referred to as the tray collection place 700. In the patient room 800, six patients M1 to M6 are admitted. In the vicinity of an entrance of the patient room 800, a used tray return table 801 is installed.

For example, in the kitchen room 700 that is the delivery source, a cooking staff puts meal service trays P1 to P6 carrying hospital meals in the housing chamber of the mobile robot 100. Then, a hospital staff inputs the patient room 800, where the patients M1 to M6 are admitted, into the mobile robot 100 as the delivery destination of the meal service trays P1 to P6. As a consequence, the mobile robot 100 delivers the meal service trays P1 to P6 from the kitchen room 700 to the patient room 800 along a route R1 derived from the floor map.

The hospital staff also puts, for example, used meal service trays (hereinafter, used trays) P1 to P6 after the patients M1 to M6 finish their meals into the housing chamber of the mobile robot 100 in the patient room 800 that is the delivery source. Then, the hospital staff inputs the tray collection place 700 as the delivery destination of the used trays P1 to P6 into the mobile robot 100. As a consequence, the mobile robot 100 delivers the used trays P1 to P6 from the patient room 800 to the tray collection place 700 along a route R2 derived from the floor map.

The mobile robot 100 may be configured to put items, disposed in a prescribed place, in the housing chamber by itself, and then deliver the items to a specified delivery destination to provide the items, by default or by instructions from the server device or the like.

Specifically, the mobile robot 100 may be configured to put the meal service trays P1 to P6 carrying hospital meals into the housing chamber by itself in the kitchen room 700, and then deliver the meal service trays P1 to P6 to the specified patient room 800 to provide them to the patients M1 to M6 who are admitted to the patient room 800. The mobile robot 100 may also be configured to put the used trays P1 to P6, which are returned to the return table 801 that is installed in the vicinity of the entrance of the patient room 800, in the housing chamber by itself, and then deliver the used trays P1 to P6 to the specified tray collection place 700 so as to return them to the tray collection place 700.

In the example shown in FIG. 4, the mobile robot 100 travels back and forth between the kitchen room 700 and one patient room 800. However, without being limited to this example, the mobile robot 100 may be configured to travel back and forth between the kitchen room 700 and a plurality of patient rooms 800, or may be configured to deliver other items to other delivery destinations during free time.

Here, the mobile robot 100 is basically set to go to collect the used trays P1 to P6 returned to the return table 801 when appointed time comes. For example, when meals are provided to each patient at 18:00, the mobile robot 100 is set to go to collect the used trays P1 to P6 returned to the return table 801 at appointed time of 21:00. However, in the case where, for example, the patient M1 has no appetite, and therefore returns the used tray P1 to the return table 801 at 18:30, the used tray P1 ends up being left on the return table 801 for about two and a half hours. When the used tray is left uncollected in the vicinity of the entrance of the patient room for a long time due to the used tray being returned earlier than expected, it causes sanitary problems, such as an odor of leftovers. The trays left uncollected may also cause fasting patients to snitch the leftovers.

As a solution, when it is detected that one or more trays, among a plurality of trays used for meal service, are returned to the prescribed place (e.g., the return table 801), the mobile robot 100 according to the present embodiment collects the trays returned to the prescribed return place and delivers them to the specified delivery destination. In other words, when it is detected that one or more trays, among a plurality of trays used for meal service, are returned to the prescribed place, the control unit 180 of the mobile robot 100 according to the present embodiment instructs the mobile robot 100 to collect the trays returned to the prescribed return place and delivers them to the specified delivery destination. As a result, the mobile robot 100 according to the present embodiment immediately collects the used trays returned to the prescribed return place even before appointed time. This makes it possible to prevent the used trays from being left uncollected for a long time, so that enhanced sanitation is achieved.

Whether or not the trays are returned to the prescribed return place and the number of returned trays are detected in any way. For example, whether or not the trays are returned to the prescribed return place and the number of returned trays are detected based on the photographed images of the facility camera 400 that photographs the prescribed return place. Alternatively, the plurality of trays used for meal service may each be attached with an IC tag, and the return table at the prescribed return place may be equipped with a tag reader. Based on the result of reading the IC tag by the tag reader, whether or not the trays are returned to the return table and the number of returned trays may be detected. Alternatively, the return table at the prescribed return place may be equipped with a load sensor. Based on the load detected by the load sensor, whether or not the trays are returned to the return table and the number of returned trays may be detected.

Figure 5:
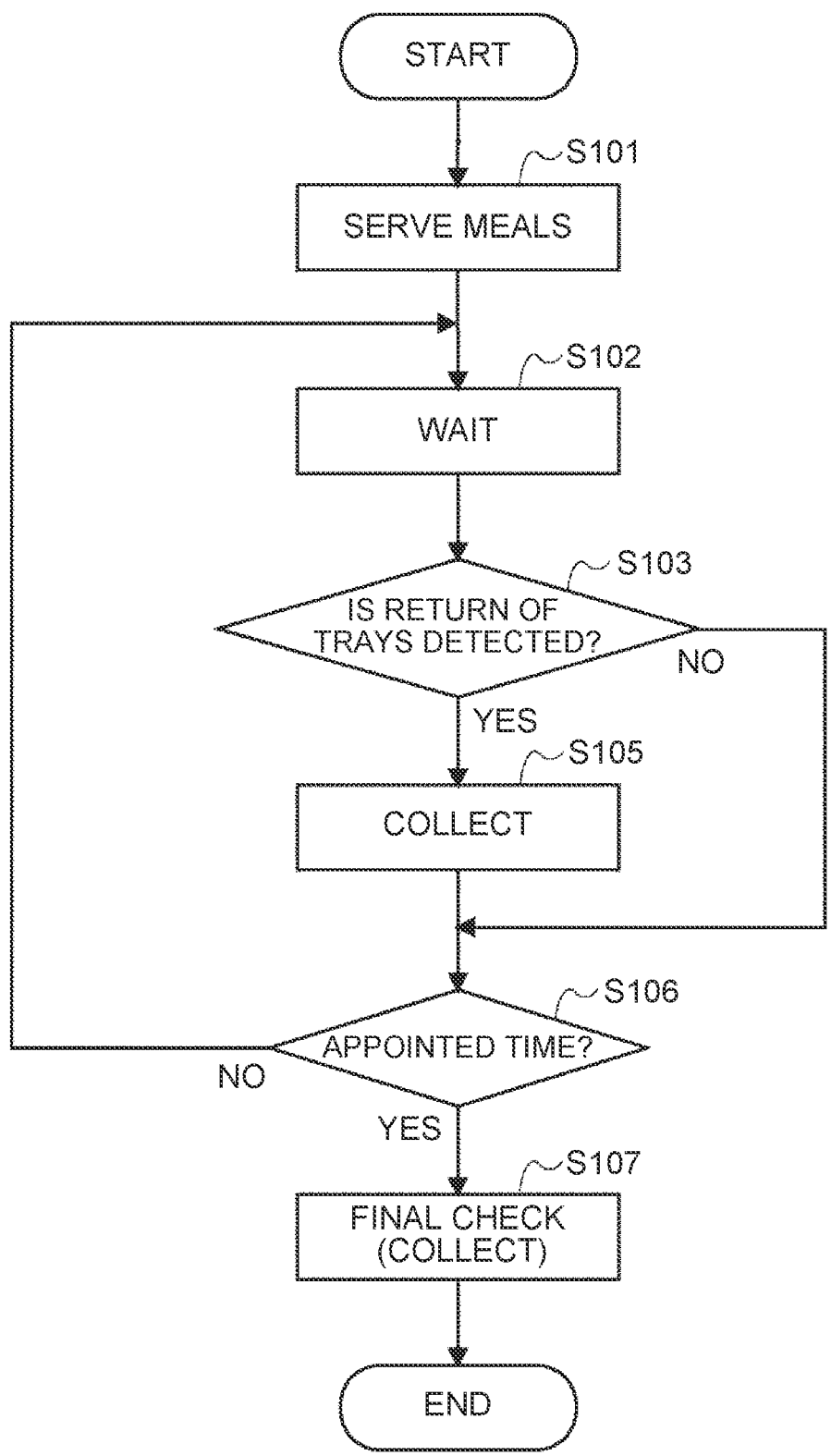
FIG. 5 is a flowchart showing an example of operation of the mobile robot according to the first embodiment.

FIG. 5 is a flowchart showing an example of the operation of the mobile robot 100 in the hospital shown in FIG. 4.

First, when hospital meals are ready, the mobile robot 100 puts the meal service trays P1 to P6 carrying the hospital meals into the housing chamber in the kitchen room 700, and then delivers the meal service trays P1 to P6 to the specified patient room 800 to provide them to the patients M1 to M6 at 18:00, for example (step S101)

The mobile robot 100 then waits for a while (step S102). The mobile robot 100 may deliver items other than the meal service trays during the waiting period.

For example, when it is not detected that the used trays P1 to P6 are returned to the return table 801 until appointed time of 21:00 (NO in step S103), the mobile robot 100 does not go to collect the trays before the appointed time. Instead, the mobile robot 100 goes to collect the used trays P1 to P6 when the appointed time comes (YES in step S106→step S107).

Meanwhile, when it is detected that the used tray P1 is returned to the return table 801 at, for example, 19:00 that is before the appointed time (YES in step S103), the mobile robot 100 immediately goes to collect the used tray P1, even before the appointed time. The mobile robot 100 then collects the used tray P1 returned to the return table 801, and delivers the used tray P1 to the tray collection place (kitchen room) 700 (step S105). The process of collecting the used tray before the appointed time by the mobile robot 100 is repeated until the appointed time comes (NO in step S106). Then, once the appointed time comes, the mobile robot 100 collects the remaining used trays, which also serves as a final check (step S107).

Thus, when it is detected that any one trays, among the trays P1 to P6 used for meal service, are returned to the return table 801 in the vicinity of the entrance of the patient room 800, the mobile robot 100 shown in the example of FIG. 5 immediately collects used trays returned to the return table 801 even before the appointed time. This makes it possible to prevent the used trays from being left uncollected for a long time, so that enhanced sanitation is achieved. It is also possible to prevent fasting patients from snitching the leftovers.

In the example described, when it is detected that any one tray, among the trays P1 to P6 used for meal service, is returned to the return table 801, the mobile robot 100 collects the returned used tray. However, the present disclosure is not limited to this example. When it is detected that two or more prescribed number of trays are returned to the return table 801, the mobile robot 100 may go to collect the prescribed number of returned used trays. This makes it possible to reduce the number of times that the mobile robot 100 collects the trays.

Figure 6:
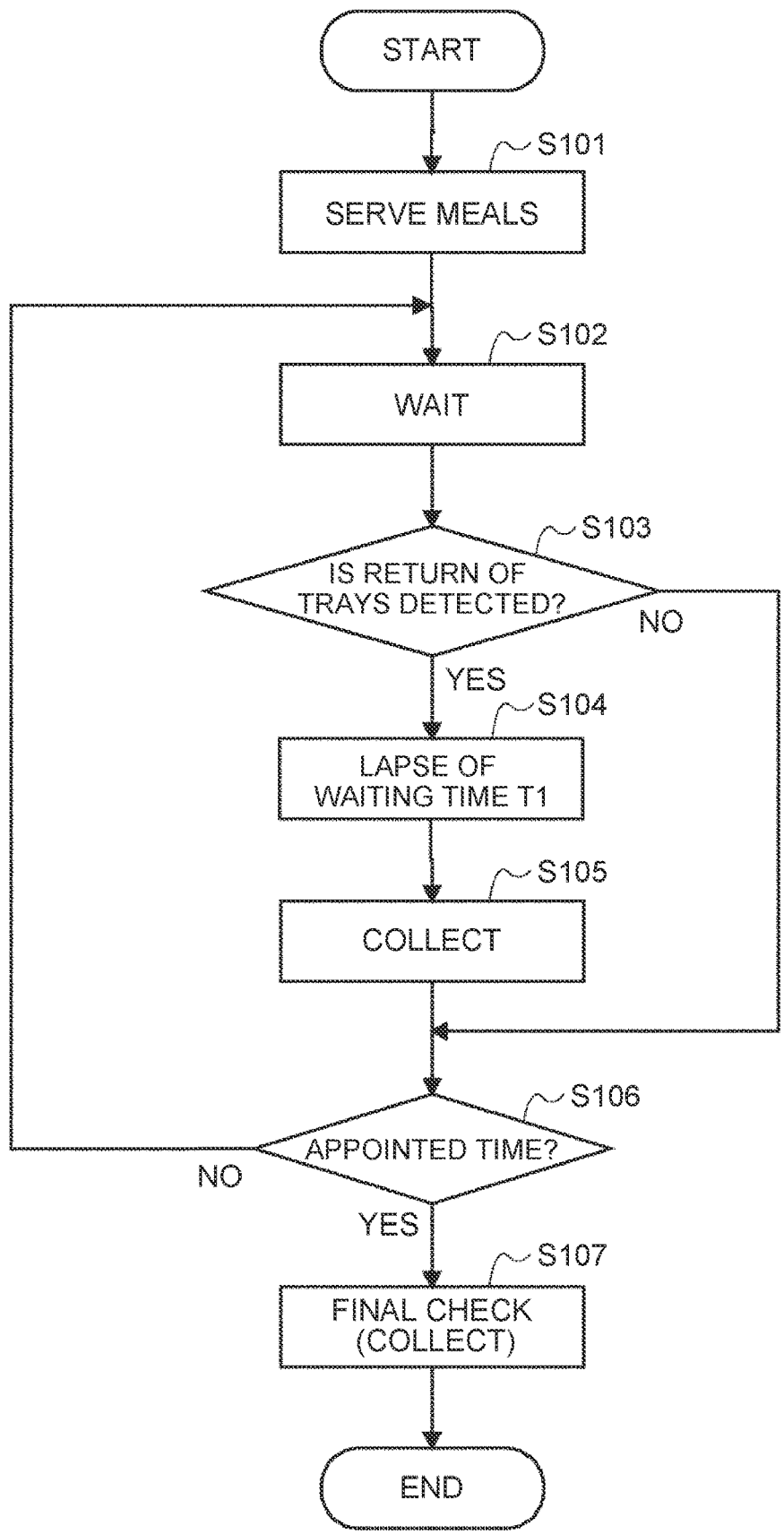
FIG. 6 is a flowchart showing another example of the operation of the mobile robot according to the first embodiment.

FIG. 6 is a flowchart showing another example of the operation of the mobile robot 100 in the hospital shown in FIG. 4. Hereinafter, operation details different from those described in FIG. 5 will be described.

In the example of FIG. 6, when it is detected that the used tray P2 is returned to the return table 801 at, for example, 19:00 that is before the appointed time (YES in step S103), the mobile robot 100 waits for a prescribed time T1 that is, for example, about one hour (step S104), and then goes to collect the used tray P2 (step S105). As a consequence, when another used tray P3 is returned during a period from the return of the used tray P2 to the lapse of prescribed time T1 (a period between 19:00 and 20:00 in this example), the mobile robot 100 can collectively collect the used trays P2, P3.

In short, the mobile robot 100 shown in the example of FIG. 6 can prevent the used trays from being left uncollected for a long time to enhance the sanitation, while reducing the number of times to collect the trays.

Figure 7:
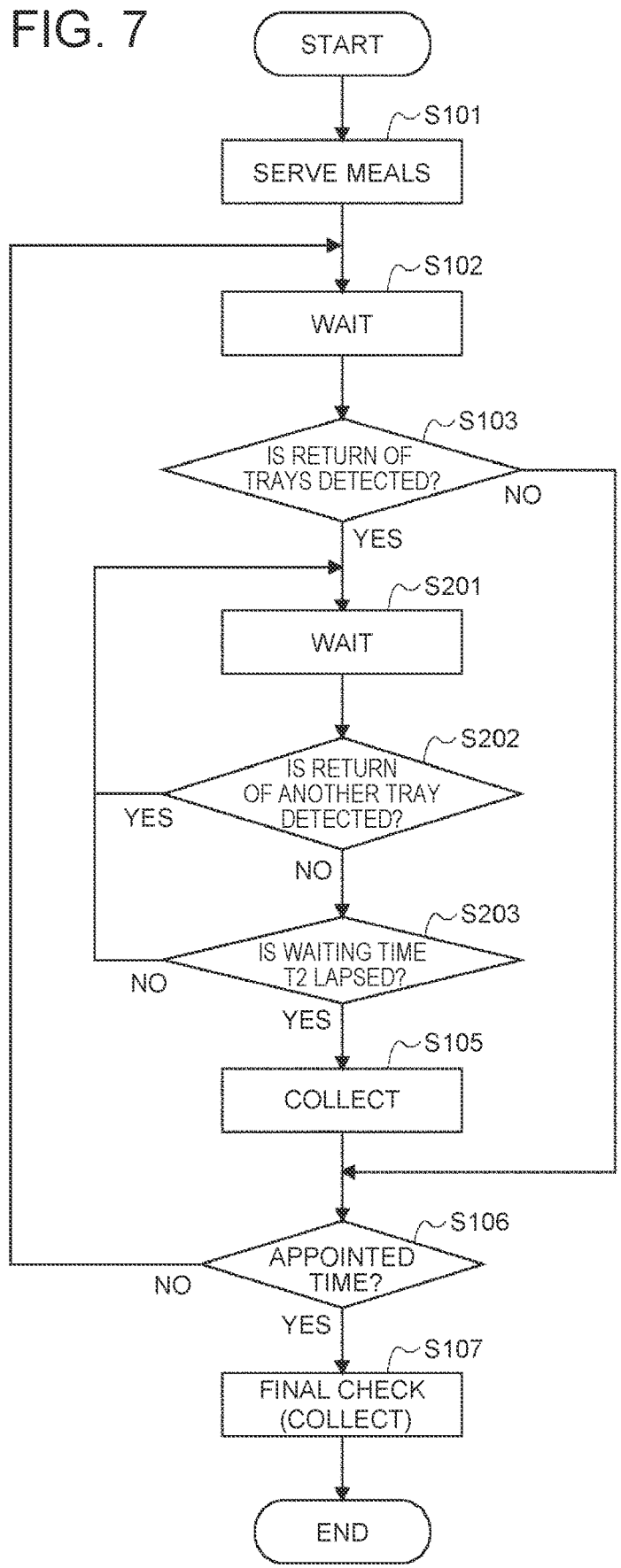
FIG. 7 is a flowchart showing another example of the operation of the mobile robot according to the first embodiment.

FIG. 7 is a flowchart showing another example of the operation of the mobile robot 100 in the hospital shown in FIG. 4.

First, when hospital meals are ready, the mobile robot 100 puts the meal service trays P1 to P6 carrying the hospital meals into the housing chamber in the kitchen room 700, and then delivers the meal service trays P1 to P6 to the specified patient room 800 to provide them to the patients M1 to M6 at 18:00, for example (step S101)

The mobile robot 100 then waits for a while (step S102). The mobile robot 100 may deliver items other than the meal service trays during the waiting period.

For example, when it is not detected that the used trays P1 to P6 are returned to the return table 801 until the appointed time of 21:00 (NO in step S103), the mobile robot 100 does not go to collect the trays before the appointed time. Instead, the mobile robot 100 goes to collect the used trays P1 to P6 when the appointed time comes (step S106 YES→step S107).

Meanwhile, when it is detected that the used tray P3 is returned to the return table 801 at, for example, 19:00 that is before the appointed time (YES in step S103), the mobile robot 100 waits for a while (step S201). When another used tray is not returned during a waiting time T2 that is, for example, about 15 minutes (NO in step S202→YES in step S203), the mobile robot 100 goes to collect the used tray P3 (step S105).

Here, when it is detected that another used tray P4 is returned to the return table 801 during the waiting time T2 (YES in step S202), the mobile robot 100 waits for a while after the used tray P4 is returned to the return table 801 (step S201). When another used tray is not returned during the waiting time T2 after the tray P4 is returned (NO in step S202→YES in step S203), the mobile robot 100 goes to collect the used trays P3, P4 (step S105).

The process of collecting the used trays by the mobile robot 100 before the appointed time is repeated until the appointed time comes (NO in step S106). Then, once the appointed time comes, the mobile robot 100 collects the remaining used trays, which also serves as a final check (step S107).

Thus, the mobile robot 100 shown in the example in FIG. 7 can demonstrate the same effect as the mobile robot 100 shown in the example in FIG. 5. In addition, the mobile robot 100 shown in the example in FIG. 7 waits for a short period of time after any one of the used trays is returned. When another used tray is returned during the waiting time, the mobile robot 100 collectively collects the used trays. Hence, the mobile robot 100 shown in the example of FIG. 7 can prevent the used trays from being left uncollected for a long time to enhance the sanitation, while reducing the number of times to collect the trays.

Second Embodiment

Next, a robot control system according to a second embodiment will be described. In the present embodiment, the case where the robot control system includes one or more mobile robots and a server device (controller) that manages (controls) the mobile robots will be described.

Specifically, the robot control system includes one or more mobile robots 100 and the server device 300. Since the configuration of the mobile robot 100 is similar to the configuration described in the first embodiment, the description thereof is omitted.

The mobile robot 100 according to the present embodiment may be configured such that some of the functions of the mobile robot 100 in the first embodiment are included in the server device 300. For example, the server device 300 may be configured to instruct one or more mobile robots 100 to deliver the meal service trays carrying hospital meals and to collect the used trays.

For example, the server device 300 is a computer having communication functions. The server device 300 may be installed in any place as long as the server device 300 can communicate with each component member of the robot control system. The server device 300 transmits and receives position information and travel information regarding the mobile robots 100.

Figure 8:
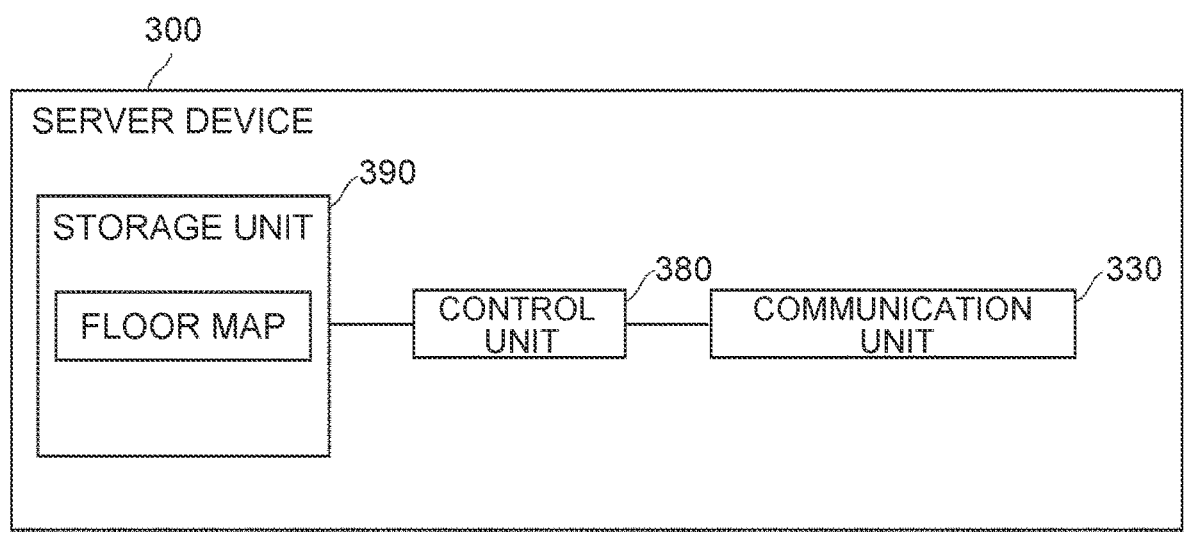
FIG. 8 is a block diagram illustrating a server device provided in the robot control system according to a second embodiment.

FIG. 8 is a block diagram illustrating the server device provided in the robot control system according to the second embodiment. As shown in FIG. 8, the server device 300 includes a communication unit 330, a control unit 380, and a storage unit 390.

The communication unit 330 communicates separately with each of the mobile robots 100. The communication unit 330 outputs the signals received from each component member to the control unit 380. The communication unit 330 also transmits the signals output from the control unit 380 to each component member as appropriate. The communication unit 330 may include a router device for communication performed between the server device 300 and a plurality of component members. For communication between the server device 300 and the plurality of component members, the communication unit 330 may have a plurality of different communication techniques for each of the component members that are communication partners. The communication unit 330 may be connected communicably with each component member via an intranet line or the Internet line.

The control unit 380 is constituted of an arithmetic device, such as a CPU, to perform various information processing. The control unit 380 may be configured to instruct one or more mobile robots 100 to deliver the meal service trays carrying hospital meals and to collect the used trays.

The storage unit 390 includes a non-volatile memory such as flash memories and SSDs. The storage unit 390 stores the floor map of the facility that is used for autonomous movement of the mobile robot 100. The storage unit 390 is connected to the control unit 380, and outputs the stored information to the control unit 380 in response to a request from the control unit 380.

Figure 9:
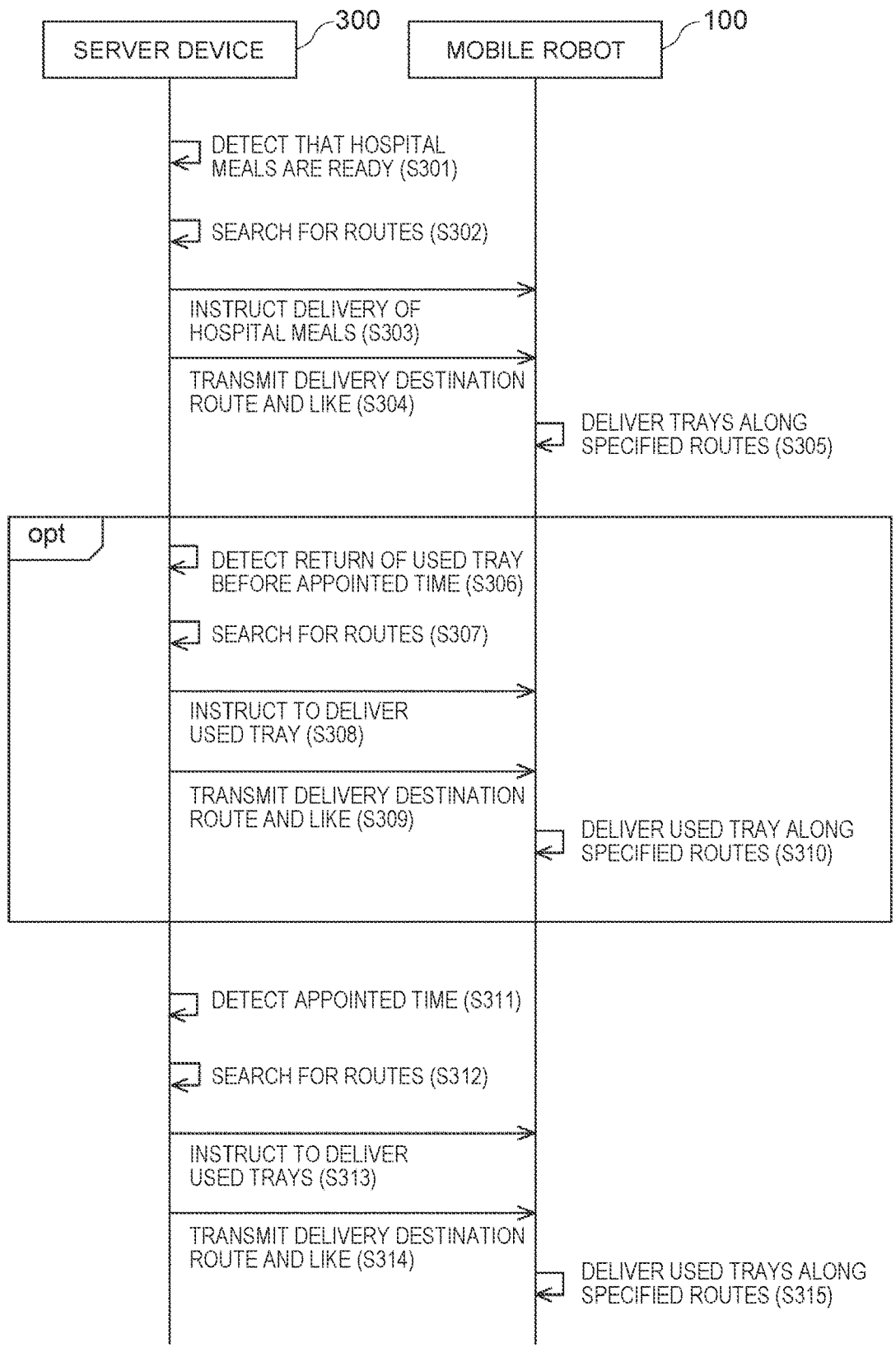
FIG. 9 is a sequence diagram illustrating operation of the robot control system according to the second embodiment.

FIG. 9 is a sequence diagram illustrating operation of the robot control system according to the second embodiment. In the example of FIG. 9, the case where the server device 300 instructs one mobile robot 100 to deliver the meal service trays is described. However, without being limited to this case, the server device 300 may instruct a plurality of mobile robots 100 to deliver the meal service trays.

As shown in FIG. 9, when, for example, it is detected that hospital meals are ready in the kitchen room 700 (step S301), the server device 300 instructs the mobile robot 100 to deliver the meal service trays P1 to P6 carrying the hospital meals from the kitchen room 700 to the patient room 800 (step S303). At this point, the server device 300 searches for a route from a current position of the mobile robot 100 to the kitchen room 700 as a delivery source, and a route R1 from the kitchen room 700 to the patient room 800 (step S302), and transmits confirmed routes to the mobile robot 100 (step S304).

As a consequence, the mobile robot 100 moves along the route received from the server device 300 to the kitchen room 700 that is the delivery source. When the mobile robot 100 receives the meal service trays P1 to P6 carrying hospital meals, the mobile robot 100 delivers the meal service trays P1 to P6 along the route R1 to the patient room 800 (step S305).

After the patients or the like finish the meals, the mobile robot 100 collects the used trays in response to an instruction from the server device 300. The flow of collecting the used trays by the mobile robot 100 is basically the same as the processing flows shown in FIGS. 5 to 7. The processing flow corresponding to the processing flow shown in FIG. 5 will be described below.

Basically, when appointed time comes (step S311), the server device 300 instructs the mobile robot 100 to collect the used trays P1 to P6 returned to the return table 801 (step S313). At this point, the server device 300 searches for a route from the current position of the mobile robot 100 to the return table 801 in the vicinity of the entrance of the patient room 800 that is the delivery source, and a route R2 from the return table 801 to the tray collection place 700 (step S312). The server device 300 transmits confirmed route information to the mobile robot 100 (step S314).

As a consequence, the mobile robot 100 moves along the route received from the server device 300 to the return table 801 that is the delivery source, collects the used trays returned to the return table 801, and deliver the used trays to the tray collection place 700 along the route R2 (step S315).

When it is detected that the used tray P1 is returned to the return table 801 before the appointed time (step S306), the server device 300 instructs the mobile robot 100 to immediately go to collect the used tray P1 even before the appointed time (step S308). At this point, the server device 300 searches for the route from the current position of the mobile robot 100 to the return table 801 in the vicinity of the entrance of the patient room 800 that is the delivery source, and the route R2 from the return table 801 to the tray collection place 700 (step S307). The server device 300 transmits confirmed route information to the mobile robot 100 (step S309).

As a consequence, the mobile robot 100 moves along the route received from the server device 300 to the return table 801 that is the delivery source, collects the used tray P1 returned to the return table 801, and delivers the used tray P1 to the tray collection place 700 along the route R2 (step S310). The process of collecting the used tray by the mobile robot 100 before the appointed time is repeated until the appointed time comes.

Thus, when it is detected that one or more trays, among a plurality of trays used for meal service, are returned to the prescribed return place, the robot control system according to the present embodiment instructs the mobile robot 100 to collect the trays returned to the prescribed return place and delivers them to the specified delivery destination. Therefore, the robot control system according to the present embodiment immediately collects the used trays returned to the prescribed return place even before appointed time. This makes it possible to prevent the used trays from being left uncollected for a long time, so that enhanced sanitation is achieved.

Note that an applicable embodiment of the present disclosure is not limited to the embodiments disclosed, and appropriate modifications may be made without departing from the scope of the present disclosure. For example, a combination of component members of the first embodiment and the second embodiment is also within the technical ideas of the present embodiment. An autonomous moving method and an autonomous moving program as described below are also within the technical ideas of the present embodiment.

Furthermore, the present disclosure can implement some or all the processing in the mobile robot 100 and the server device 300 by causing the central processing unit (CPU) to execute computer programs.

The programs described above can be stored using various types of non-transitory computer-readable media, and be supplied to computers. The non-transitory computer-readable media include various types of tangible storage media. Examples of the non-transitory computer-readable media include magnetic recording media, magneto-optical recording media, read only memories (CD-ROMs), CD-Rs, CD-R/Ws, and semiconductor memories. Examples of the magnetic recording media include flexible disks, magnetic tapes, hard disk drives, and the like. Examples of the magneto-optical recording media include magneto-optical disks and the like. Examples of the semiconductor memories include mask ROMs, programmable ROMs (PROMs), erasable PROMs (EPROMs), flash ROMs, random access memories (RAMs), and the like. The programs may be supplied to computers using various types of transitory computer-readable media. Examples of the transitory computer-readable media include electrical signals, optical signals, and electromagnetic waves. The transitory computer-readable media can supply the programs to computers via wired communication channels, such as wires, and optical fibers, or wireless communication channels.

Note that an applicable embodiment of the present disclosure is not limited to the embodiments disclosed, and appropriate modifications may be made without departing from the scope of the present disclosure. For example, a combination of component members of the first embodiment and the second embodiment is also within the technical ideas of the present embodiment. The robot control method and the control program described below are also within the technical ideas of the present embodiment.

Appendix 1

A robot control method including:
a step of monitoring a return status of a plurality of trays to a first prescribed place, the trays being used for meal service within the facility; and
a step of instructing, when it is detected that one or more used trays, among the plurality of trays used for meal service, are returned to the first prescribed place, the mobile robot to collect the trays returned to the first prescribed place and deliver the trays to a second prescribed place.

Appendix 2

The robot control method according to Appendix 1, wherein in the step of instructing delivery, when it is detected that two or more prescribed number of trays, among the plurality of trays used for meal service, are returned to the first prescribed place, the mobile robot is instructed to collect the prescribed number of trays returned to the first prescribed place and to deliver the trays to the second prescribed place.

Appendix 3

The robot control method according to Appendix 1, wherein in the step of instructing delivery, when a first prescribed time elapses after any one tray, among the plurality of trays used for meal service, is returned to the first prescribed place, the mobile robot is instructed to collect the tray returned to the first prescribed place and to deliver the tray to the second prescribed place.

Appendix 4

The robot control method according to Appendix 1, wherein in the step of instructing delivery, when another tray, among the plurality of trays used for meal service, is not returned to the first prescribed place after lapse of a second prescribed time after the any one tray is returned to the first prescribed place, the mobile robot is instructed to collect the tray returned to the first prescribed place and to deliver the tray to the second prescribed place.

Appendix 5

The robot control method according to any one of Appendixes 1 to 4, wherein in the step of monitoring the return status, the number of trays returned to the first prescribed place is detected based on an image photographed by a camera that is configured to photograph the first prescribed place.

Appendix 6

The robot control method according to any one of Appendixes 1 to 4, wherein:
the plurality of trays used for meal service are each attached with an IC tag;
the first prescribed place is provided with a return table having a tag reader; and
in the step of monitoring the return status, the number of trays returned to the first prescribed place is detected based on a result of reading the IC tag by the tag reader.

Appendix 7

The robot control method according to any one of Appendixes 1 to 4, wherein:
the first prescribed place is provided with a return table equipped with a load sensor; and
in the step of monitoring the return status, the number of trays returned to the first prescribed place is detected based on a load detected by the load sensor.

Appendix 8

A control program causing a computer to execute processing including:
processing to monitor a return status of a plurality of trays to a first prescribed place, the trays being used for meal service within the facility; and
processing to instruct, when it is detected that one or more used trays, among the plurality of trays used for meal service, are returned to the first prescribed place, the mobile robot to collect the trays returned to the first prescribed place and deliver the trays to a second prescribed place.

Appendix 9

The control program according to Appendix 8, wherein in the step of instruction delivery, when it is detected that two or more prescribed number of used trays, among the plurality of trays used for meal service, are returned to the first prescribed place, the mobile robot is instructed to collect the prescribed number of trays returned to the first prescribed place and deliver the trays to the second prescribed place.

Appendix 10

The control program according to Appendix 8, wherein in the step of instructing delivery, when a first prescribed time elapses after any one tray, among the plurality of trays used for meal service, is returned to the first prescribed place, the mobile robot is instructed to collect the tray returned to the first prescribed place and deliver the tray to the second prescribed place.

Appendix 11

The control program according to Appendix 8, wherein in the step of instructing delivery, when another tray, among the plurality of trays used for meal service, is not returned to the first prescribed place after lapse of a second prescribed time after the any one tray is returned to the first prescribed place, the mobile robot is instructed to collect the tray returned to the first prescribed place and deliver the tray to the second prescribed place.

Appendix 12

The control program according to any one of Appendixes 8 to 11, wherein in the step of monitoring the return status, the number of trays returned to the first prescribed place is detected based on an image photographed by a camera that is configured to photograph the first prescribed place.

Appendix 13

The control program according to any one of Appendixes 8 to 11, wherein:
the plurality of trays used for meal service are each attached with an IC tag;
the first prescribed place is provided with a return table having a tag reader; and
in the step of monitoring the return status, the number of trays returned to the first prescribed place is detected based on a result of reading the IC tag by the tag reader.

Appendix 14

The control program according to any one of Appendixes 8 to 11, wherein:
the first prescribed place is provided with a return table equipped with a load sensor; and
in the step of monitoring the return status, the number of trays returned to the first prescribed place is detected based on a load detected by the load sensor.

What is claimed is:

1. A robot control system for controlling a mobile robot that is configured to move autonomously within a facility, wherein when it is detected that one or more used trays, among a plurality of trays used for meal service within the facility, are delivered to a first prescribed place after a meal is finished and before an appointed time, the system instructs the mobile robot to collect the one or more used trays delivered to the first prescribed place and deliver the trays to a second prescribed place,
wherein at the appointed time, the system instructs the mobile robot to travel to the first prescribed place, and when one or more used trays are delivered to the first prescribed place, to collect the one or more used trays delivered to the first prescribed place and to deliver the one or more used trays to the second prescribed place.

2. The robot control system according to claim 1, wherein when it is detected that two or more used trays, among the plurality of trays used for meal service, are returned to the first prescribed place, the system instructs the mobile robot to collect the two or more trays returned to the first prescribed place and deliver the trays to the second prescribed place.

3. The robot control system according to claim 1, wherein when a first prescribed time elapses after any one tray, among the plurality of trays used for meal service, is returned to the first prescribed place, the system instructs the mobile robot to collect the tray returned to the first prescribed place and deliver the tray to the second prescribed place.

4. The robot control system according to claim 1, wherein when another tray, among the plurality of trays used for meal service, is not returned to the first prescribed place after lapse of a second prescribed time after an one tray is returned to the first prescribed place, the system instructs the mobile robot to collect the tray returned to the first prescribed place and deliver the tray to the second prescribed place.

5. The robot control system according to claim 4, wherein the mobile robot further collects one or more other trays that are delivered to the first prescribed place in addition to the tray when collecting the tray delivered to the first prescribed place.

6. The robot control system according to claim 1, wherein the system detects the number of trays returned to the first prescribed place based on an image photographed by a camera that is configured to photographer the first prescribed place.

7. The robot control system according to claim 1, wherein:
the plurality of trays used for meal service are each attached with an integrated circuit tag;
the first prescribed place is provided with a return table having a tag reader; and
the system detects the number of trays returned to the first prescribed place based on a result of reading the integrated circuit tag by the tag reader.

8. The robot control system according to claim 1, wherein:
the first prescribed place is provided with a return table equipped with a load sensor; and
the system detects the number of trays returned to the first prescribed place based on a load detected by the load sensor.

9. The robot control system according to claim 1, comprising:
the mobile robot configured to move autonomously within the facility; and
a controller configured to control the mobile robot.

10. A robot control method, comprising:
monitoring a delivery status of a plurality of trays to a first prescribed place, the trays being used for meal service within a facility;
instructing, when it is detected that one or more used trays, among the plurality of trays used for meal service, are delivered to the first prescribed place after a meal is finished and before an appointed time, a mobile robot to collect the one or more used trays delivered to the first prescribed place and deliver the trays to a second prescribed place; and
at the appointed time, instructing the mobile robot to travel to the first prescribed place, and when one or more used trays are delivered to the first prescribed place, to collect the one or more used trays delivered to the first prescribed place and to deliver the one or more used trays to the second prescribed place.

11. The robot control method according to claim 10, wherein when another tray, among the plurality of trays used for meal service, is not returned to the first prescribed place after lapse of a second prescribed time after an one tray is returned to the first prescribed place, instructing the mobile robot to collect the tray returned to the first prescribed place and deliver the tray to the second prescribed place.

12. The robot control method according to claim 11, wherein the mobile robot is further instructed to collect one or more other trays that are delivered to the first prescribed place in addition to the tray when collecting the tray delivered to the first prescribed place.

13. A non-transitory storage medium that stores a control program causing a computer to execute processing comprising:

processing to monitor a delivery status of a plurality of trays to a first prescribed place, the trays being used for meal service within a facility;

processing to instruct, when it is detected that one or more used trays, among the plurality of trays used for meal service, are delivered to the first prescribed place after a meal is finished and before an appointed time, a mobile robot to collect the one or more used trays delivered to the first prescribed place and deliver the trays to a second prescribed place; and at the appointed time, instructing the mobile robot to travel to the first prescribed place, and when one or more used trays are delivered to the first prescribed place, to collect the one or more used trays delivered to the first prescribed place and to deliver the one or more used trays to the second prescribed place.

14. The non-transitory storage medium according to claim 13 further comprising when another tray, among the plurality of trays used for meal service, is not returned to the first prescribed place after lapse of a second prescribed time after an one tray is returned to the first prescribed place, processing to instruct the mobile robot to collect the tray returned to the first prescribed place and deliver the tray to the second prescribed place.

15. The non-transitory storage medium according to claim 14 further comprising processing to instruct the mobile robot to collect one or more other trays that are delivered to the first prescribed place in addition to the tray when collecting the tray delivered to the first prescribed place.

\* \* \* \* \*